United States Patent [19]

Zenbutsu et al.

[11] Patent Number: 4,605,635

[45] Date of Patent: Aug. 12, 1986

[54] CARBON-CONTAINING REFRACTORY

[75] Inventors: Tadashi Zenbutsu, Tokyo; Hiroyuki Kokumai, Atsugi; Shinji Okikawa; Keiji Saito, both of Zama, all of Japan

[73] Assignee: Shinagawa Refractories Co., Ltd., Tokyo, Japan

[21] Appl. No.: 691,982

[22] Filed: Jan. 16, 1985

[30] Foreign Application Priority Data

Jan. 17, 1984 [JP] Japan .................................. 59-4769

[51] Int. Cl.$^4$ ...................... C04B 35/52; C04B 35/54; C04B 35/56; C04B 35/58
[52] U.S. Cl. ............................... 501/96; 501/90; 501/92; 501/97; 501/98; 501/99; 501/100; 501/101
[58] Field of Search ................... 501/99, 100, 101, 92, 501/96, 97, 98, 90

[56] References Cited

U.S. PATENT DOCUMENTS

| | | | |
|---|---|---|---|
| 3,770,487 | 11/1973 | Gibson et al. | 501/99 |
| 4,306,030 | 12/1981 | Watanabe et al. | 501/99 |
| 4,471,059 | 9/1984 | Yoshino et al. | 501/99 |

FOREIGN PATENT DOCUMENTS

| | | |
|---|---|---|
| 54-39422 | 3/1979 | Japan . |
| 54-163913 | 12/1979 | Japan . |
| 55-65348 | 5/1980 | Japan . |
| 55-107749 | 8/1980 | Japan . |
| 56-59668 | 5/1981 | Japan . |
| 57-166362 | 10/1982 | Japan . |

Primary Examiner—Mark L. Bell
Attorney, Agent, or Firm—Wenderoth, Lind & Ponack

[57] ABSTRACT

The present invention provides a carbon-containing refractory composition characterized by containing 0.1–10 parts by weight of silicon hexaboride in 100 parts by weight of refractory material comprising 3–95 parts by weight of carbonaceous material such as graphite and 97–5 parts by weight of refractory aggregate.

In the carbon-containing refractory composition of the present invention, silicon hexaboride is oxidized producing boron oxide on the surface of the refractory at a high temperature during operation, and the surface of the refractory is covered by the formation of a highly viscous molten liquid like kotoite (3 $MgO \cdot B_2O_3$), for example, which is formed from the components of the refractory, such as MgO, for example, thus particles of carbonaceous material such as graphite can be protected from oxidation.

The present invention therefore provides a refractory that has superior oxidation resistance which can be effectively utilized in such fields as metallurgy, pig iron production, steel production, etc.

4 Claims, No Drawings

CARBON-CONTAINING REFRACTORY

BACKGROUND OF THE INVENTION

The present invention relates to a carbon-containing refractory having excellent resistance to oxidation. Due to the high thermal conductivity of carbon, its resistance to wetting in relation to molten metal and slag, and its characteristic of preventing over-sintering of the refractory composition, refractories containing carbonaceous material such as graphite, when used along with another refractory aggregate, supplement the advantages of that aggregate and so they are widely used as refractories for metallurgy, in steel, pig iron production, etc.

Since carbonaceous material such as graphite, however is very easily oxidized in an oxidizing atmosphere and loses the aforementioned advantages, in order to fully exhibit the advantages of carbon containing refractories, it is very important practically to minimize the oxidation of the carbonaceous material such as graphite, that is to produce a carbon-containing refractory composition excellent in oxidation resistance.

Although a variety of attempts have been carried out up to the present, as means to prevent the oxidation of carbon containing refractory compositions there is still no satisfactory process as yet.

Even though, as seen from Japanese Laid Open Patent Application Nos. 54-39422, 54-163913, 55-65348, 55-107749, 56-59668, 57-166362 etc. for example, carbon-containing refractories added with one or more types of metal powder having a higher affinity for oxygen than that of carbon have been well-known, and such physical techniques for preventing oxidation of carbon as cutting off the contact of carbon with oxygen by covering the particles of carbon with vitreous silicate, borate, phosphate etc., have also been disclosed, none of these have been satisfactory.

SUMMARY OF THE INVENTION

In order to overcome the defects of the prior art from the aforementioned point of view, the present invention provides a carbon-containing refractory composition with very excellent oxidation resistant properties characterized by containing 0.1-10 parts by weight of silicon hexaboride in 100 parts by weight of refractory comprising 3-95 parts by weight of carbonaceous material such as graphite and 97-5 parts by weight of refractory aggregate.

In the carbon-containing refractory composition of the present invention, the silicon hexaboride is oxidized producing boron oxide on the surface of the refractory composition during operation and the surface of the refractory is covered by forming a highly viscous molten liquid like kotoite (3 $MgO \cdot B_2O_3$), for example, which is produced from all the components of the refractory materials for example, MgO, thus particles of carbonaceous material such as graphite can be protected from oxidation. Though, the same effect as seen in silicon hexaboride is also recognized in boron oxide ($B_2O_3$) and boron carbide ($B_4C$), the silicon hexaboride used in the present invention is much superior to those boron compounds exhibiting its excellent anti-oxidizing effect. It appears that the silicon oxide, simultaneously produced together with the boron oxide during oxidation of the silicon hexaboride, makes said molten liquid have an even lower melting point and high viscosity and tightly covers the surface of the carbonaceous material such as graphite at a high temperature, specifically above 1300° C., thus the excellent anti-oxidizing effect of silicon hexaboride is exhibited.

DETAILED DESCRIPTION OF THE INVENTION

In the refractory of the present invention, oxides selected from the group consisting of magnesia, spinel, silica, zircon, dolomite or alumina and/or non-oxides selected from the group consisting of silicon carbide, silicon nitride or boron nitride are used, and although there is no particular limitation in selecting the materials, a refractory dominantly comprised of magnesia, spinel or dolomite is preferable.

In the carbonaceous material, such as graphite, natural and artificial graphite such as amorphous graphite and crystalline graphite, electrode scraps, foundry coke, iron coke, petroleum coke, carbon black etc. are used and although there is also no limitation in selecting these materials, it is preferable to employ natural graphite.

The compositional ratio of the carbonaceous materials such as graphite vary depending on the purpose of the refractory, and it is preferable to employ 3–95 parts by weight of graphite in 100 parts by weight of refractory materials. If the amount of graphite is less than 3 parts by weight, the advantages of said carbon-containing refractory composition would not be exhibited sufficiently and if the amount is more than 95 parts by weight, it would not be preferable from the points of abrasion resistance, corrosion resistance, and moldability of the refractory.

In view of reaction activities, homogeneity, dispersal characteristics, etc., the particle diameter of silicon hexaboride powder can be less than 48 mesh, however it is more preferable to use diameters less than 200 mesh.

In the present invention, the content of silicon hexaboride powder ranges from 0.1 to 10 parts by weight per 100 parts by weight of refractory material comprising carbonaceous materials such as graphite and refractory aggregate. If this content is less than 0.1 part by weight, the desired effect cannot be expected, while on the other hand if the amount is more than 10 parts by weight, the resistance to erosion loss is reduced producing an excess of oxide, while nevertheless the oxidation resistance is maintained.

The carbon-containing refractory composition of the present invention provides a material which can be used as an unburned refractory by formulating these particle sized refractory materials and silicon hexaboride at a predetermined ratio, adding one or more types of any organic resinous binder such as tar, pitch, petroleum pitch phenolic resin which has large amounts of residual carbon, press molding and drying or thermally treating the resulting mixture at 25° C.–500° C. or a burned refractory by burning at 700° C.–1500° C. in a reducing atmosphere. Moreover, thermally treating at a suitable temperature the mixture as it is, it can be supplied as an unshaped refractory for ramming mix materials, mortar materials, patching materials etc.

The present invention will be further explained below by exemplifing a preferred embodiment of the present invention and a comparative example.

EXAMPLES 1-4

5 parts by weight of resol type phenolic resin and 1 part by weight of novolak type phenolic resin were added into a formulated composition described in Table 1, said composition kneaded for 1 hour at room temperature, then subjected to press molding at 1500 kg/cm², and finally said composition was thermally treated for 7 hours at 180° C.

The characteristics of the obtained unburned carbon-containing refractory are indicated in Table 1, and it is found that the oxidation resistance of the products of the present invention were much superior to comparative products.

TABLE 1

| Example | Product of Present Invention | | | | Comparative Product | | | | | |
|---|---|---|---|---|---|---|---|---|---|---|
| | 1 | 2 | 3 | 4 | 1 | 2 | 3 | 4 | 5 | 6 |
| High Purity Sea Water Magnesite Clinker | 80 | | | | 80 | 80 | 80 | | | |
| High Purity Sintering Spinel Clinker | | 80 | 50 | 80 | | | | 80 | 50 | 80 |
| Electromelting Alumina | | | 35 | | | | | | 35 | |
| Silicon Carbide | | | | 15 | | | | | | 15 |
| Crystalline Graphite | 20 | 20 | 15 | 5 | 20 | 20 | 20 | 20 | 15 | 5 |
| Silicon Hexaboride (B$_6$Si) | 3 | 2 | 1 | 1 | | | | | | |
| Metallic Al | | | | | | 2 | | | 1 | |
| Metallic Si | | | | | | 1 | | | 1 | |
| Boron Oxide (B$_2$O$_3$) | | | | | | | 3 | | | 1 |
| Boron Carbide (B$_4$C) | | | | | | | | 2 | | |
| (1)Weight Loss after 1500° C. - 3 Hrs. Oxidizing Burning (%) | 3.0 | 4.5 | 3.5 | 1.0 | 5.0 | 11.0 | 16.0 | 6.0 | 13.0 | 3.0 |
| (2)Depth of Decarbonized Layer after 1500° C. - 3 Hrs. Oxidizing Burning (mm) | 1.5 | 2.0 | 3.0 | 2.0 | 3.0 | 6.0 | 9.0 | 4.5 | 7.0 | 4.0 |

(1)Size of sample: 40 × 40 × 40 mm
(2)The above indicated numbers show the mean values of 4 points on the section of decarbonized layer, which were exposed by cutting at the center of sample after the experiment.

As a field experiment, the products of the present invention and comparative products were evaluated at the wall and both trunnion portions of a 250 ton converter.

The damage rate of the product of the present invention (1) was 0.3 mm/charge which is about 40% less than that of the comparative product (0.5 mm/charge), the excellent resistance of the present invention being recognized.

What is claimed is:

1. A carbon-containing refractory composition consisting essentially of 0.1–10 parts by weight of silicon hexaboride, in 100 parts by weight of refractory material, said refractory material consisting essentially of 3–95 parts by weight of carbonaceous material and 97–5 parts by weight of refractory aggregate, said carbonaceous material consisting of natural and artificial graphite, foundry coke, iron coke, petroleum coke and carbon black.

2. A carbon-containing refractory composition according to claim 1 wherein the refractory aggregate consists of oxides or non-oxides.

3. A carbon-containing refractory composition according to claim 2 wherein the oxides are at least one oxide selected from the group consisting of magnesia, spinel, silica, zircon, dolomite and alumina.

4. A carbon-containing refractory composition according to claim 2 wherein the non-oxides are at least one non-oxide selected from the group consisting of silicon carbide, silicon nitride and boron nitride.

* * * * *